(12) United States Patent
Jia et al.

(10) Patent No.: US 8,689,632 B2
(45) Date of Patent: Apr. 8, 2014

(54) FULLY DECOUPLED LATERAL AXIS GYROSCOPE WITH THICKNESS-INSENSITIVE Z-AXIS SPRING AND SYMMETRIC TEETER TOTTER SENSING ELEMENT

(75) Inventors: Kemaio Jia, Phoenix, AZ (US); Yizhen Lin, Gilbert, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 255 days.

(21) Appl. No.: 13/351,937

(22) Filed: Jan. 17, 2012

(65) Prior Publication Data

US 2013/0180332 A1     Jul. 18, 2013

(51) Int. Cl.
    *G01C 19/56* (2012.01)
(52) U.S. Cl.
    USPC ...................................... 73/504.12
(58) Field of Classification Search
    USPC ...................................... 73/504.12
    See application file for complete search history.

(56) References Cited

U.S. PATENT DOCUMENTS

| | | | |
|---|---|---|---|
| 6,691,571 B2 * | 2/2004 | Willig et al. | 73/504.12 |
| 7,140,250 B2 | 11/2006 | Leonardson et al. | |
| 7,434,464 B2 * | 10/2008 | Li | 73/504.04 |
| 2010/0107763 A1 | 5/2010 | Lin et al. | |
| 2010/0242603 A1 | 9/2010 | Miller et al. | |
| 2011/0126632 A1 | 6/2011 | McNeil et al. | |
| 2011/0270569 A1 | 11/2011 | Stephanou et al. | |

OTHER PUBLICATIONS

H. Xie et al., A CMOS-MEMS Lateral-axis Gyroscope, The 14th IEEE International Conference on Micro Electro Mechanical Systems, 2001.
S.E. Alper et al, A Single-Crystal Silicon Symmetrical and Decoupled MEMS Gyroscope on an Insulating Substrate, Journal of Microelectromechanical Systems, vol. 14, No. 4, Aug. 2005.
W. Geiger et al., Decoupled Microgyros and the Design Principle DAVED, The 14th IEEE International Conference on Micro Electro Mechanical Systems, 2001.
C. Acar et al., Structurally Decoupled Micromachined Gyroscopes with Post-Release Capacitance Enhancement, Institute of Physics Publishing, Jouranl of Micromechanics and Microengineering, 15 (2005) pp. 1092-1101, Published Apr. 14, 2005.
X.S. Liu et al., An X-Axis Micromachined Gyroscope with Doubly Decoupled Oscillation Modes, IEEE 21st International Conference on Micro Electro Mechanical Systems, 2008.
B. Lv et al., Simulation of a Novel Lateral Axis Micromachined Gyroscope in the Presence of Fabrication Imperfections, Microsystem Technologies, Micro- and Nanosystems Information Storage and Processing Systems, Springer-Verlag 2008, Published online Mar. 18, 2008.
FINDMEMS.com, SMG070: Angular Rate Sensor, printed Nov. 28, 2011.
X. Liu et al., Design and Fabrication of a Lateral Axis Gyroscope with Asymmetric Comb-Fingers as Sensing Capacitors, Proceedings of the 1st IEEE International Conference on Nano/Micro Engineered and Molecular Systems, Jan. 18-21, 2006, Zhuhau, China.
X. S. Liu et al., A Doubly Decoupled Lateral Axis Micromachined Gyroscope, Sensors and Actuators A: Physical, Elsevier B.V., Available online Nov. 13, 2008.

* cited by examiner

*Primary Examiner* — John Chapman, Jr.
(74) *Attorney, Agent, or Firm* — Terrile, Cannatti, Chambers & Holland, LLP; Michael Rocco Cannatti

(57) ABSTRACT

A micro-electromechanical systems (MEMS) transducer (400) is adapted to use lateral axis vibration of the drive mass (210) to generate non-planar oscillations of a coupling mass (220) in response to Coriolis forces created from in-plane rotation, which in turn generate non-planar motions of a symmetric teeter-totter sense mass (230) which are detected as a capacitive difference signal by capacitive electrodes (403, 404) formed on the substrate (402) below the sense mass (230).

21 Claims, 3 Drawing Sheets ic # FULLY DECOUPLED LATERAL AXIS GYROSCOPE WITH THICKNESS-INSENSITIVE Z-AXIS SPRING AND SYMMETRIC TEETER TOTTER SENSING ELEMENT

BACKGROUND OF THE INVENTION

1. Field of the Invention

The present invention is directed in general to the field of Micro-Electro-Mechanical Systems (MEMS). In one aspect, the present invention relates to MEMS inertial sensor devices and methods for operating same.

2. Description of the Related Art

Micro-Electro-Mechanical Systems (MEMS) technology is increasingly used to integrate mechanical elements, sensors, actuators, and electronics onto very small mechanical structures using conventional batch semiconductor processing techniques. For example, inertial sensors may be formed with MEMS devices on an integrated circuit wafer substrate to form various applications, such as a MEMS gyroscope that is used to detect the angular velocity. However, conventional MEMS gyroscopes have performance limitations that result from various design and manufacturing imperfections.

Accordingly, a need exists for an improved MEMS gyroscope apparatus, system and method of operations that addresses various problems in the art where various limitations and disadvantages of conventional solutions and technologies will become apparent to one of skill in the art after reviewing the remainder of the present application with reference to the drawings and detailed description which follow, though it should be understood that this description of the related art section is not intended to serve as an admission that the described subject matter is prior art.

BRIEF DESCRIPTION OF THE DRAWINGS

The present invention may be understood, and its numerous objects, features and advantages obtained, when the following detailed description is considered in conjunction with the following drawings, in which.

DETAILED DESCRIPTION

Figure 1:
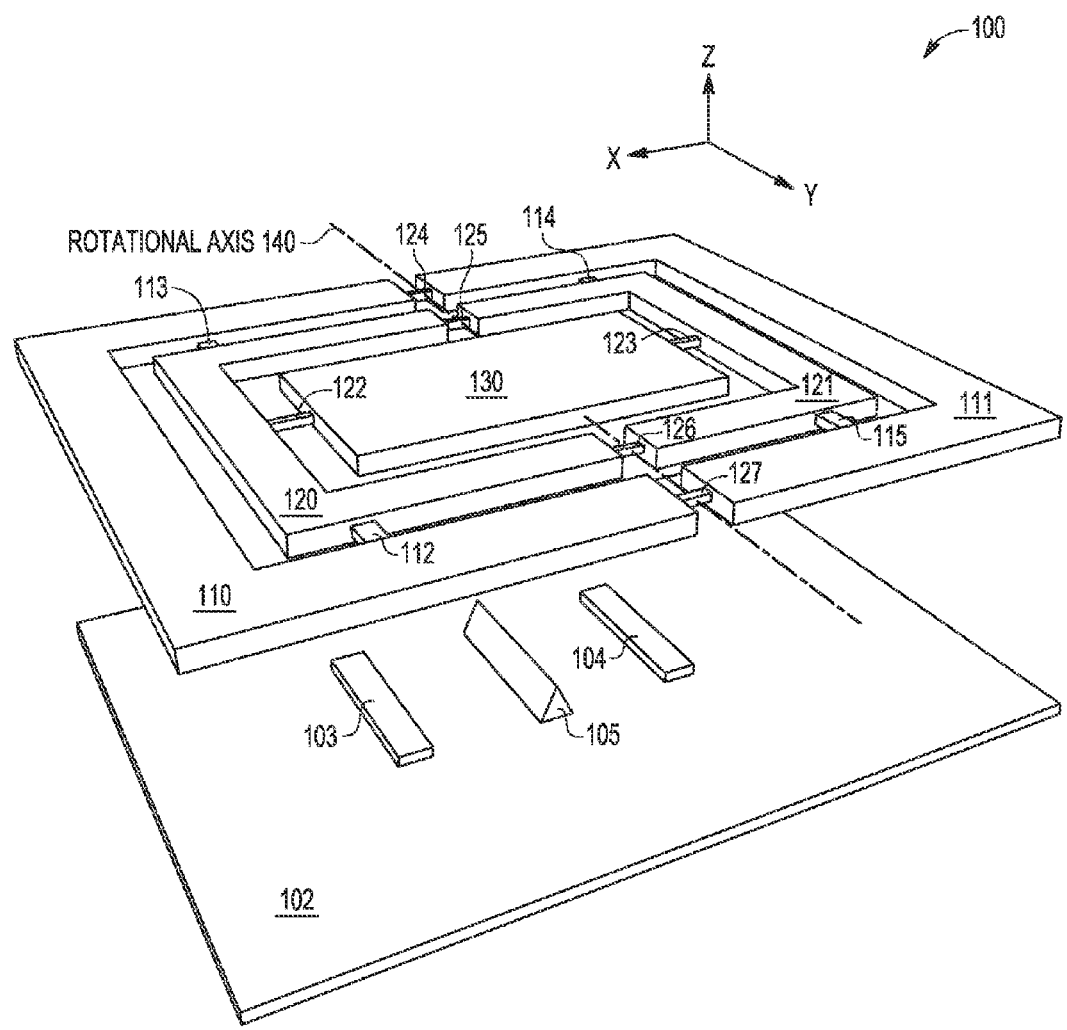
FIG. 1 depicts in perspective view a mechanical model of a symmetric, fully decoupled lateral axis gyroscope.

A lateral axis gyroscope sensor and associated methodology of operation are described which provide full motion decoupling between symmetrically designed drive and sense elements having a resonance frequency that is insensitive to thickness variations in vertical torsional springs. By fully decoupling the motion between the gyro drive and sense elements, erroneous signal input from the drive element to the sense element is reduced or minimized. In addition, a plurality of thickness insensitive vertical springs are designed to have a body portion connected to between the drive and sense elements with a plurality of torsional portions having length dimension parallel to the rotation axis that is less than the thickness of the layer in which they are formed, thereby providing a more predictable and frequency response for the gyro sensor by forming each spring to have a torsional portion that is thinner compared to the thickness. Finally, a fully symmetric sensing element is provided to suppress unwanted resonance mode response and to increase gyroscope resistance to linear acceleration.

Various illustrative embodiments of the present invention will now be described in detail with reference to the accompanying figures which illustrate different views of a single three-mass system used to form a symmetrical lateral axis gyroscope sensor. It should be appreciated that the three-mass system may be formed with different materials and/or shapes than set forth herein. For the sake of brevity, conventional techniques related to semiconductor processing, MEMS processing, and sensor technology are not described herein. While various details are set forth in the following description, it will be appreciated that the present invention may be practiced without these specific details, and that numerous implementation-specific decisions may be made to the invention described herein to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are depicted with reference to simplified plan and cross sectional views of a MEMS device without including every device feature or geometry in order to avoid limiting or obscuring the present invention. In addition, circuit details, such as drive and sense signal circuits, have not been explained in any greater extent since such details are well known and not considered necessary to teach one skilled in the art of how to make or use the present invention. Such descriptions and representations are used by those skilled in the art to describe and convey the substance of their work to others skilled in the art.

With conventional MEMS gyroscope sensors, there are performance limitations associated with various non-idealities in both the sensor design and in manufacturing imperfections. For example, sensor fabrication can involve one or more process steps (e.g., deposition, etching, patterning of materials, etc.) that can contribute to imperfections in the gyroscope that result in asymmetric structures, misalignment of actuation mechanism, non-idealities in the linking or coupling springs, and deviations of the center of mass from the geometric center. These imperfections and others can result in undesirable, systematic perturbations in the form of mechanical and electrostatic forces which degrade the performance of a gyroscope. There are also performance problems associated with conventional gyro design approaches, such as undesired resonance modes and linear acceleration that result from asymmetric sensing elements. In addition to fabrication imperfections, there are also fabrication challenges posed by certain sensor designs, such as out-of-plane sensors that include uneven comb finger capacitor plates for detection since these sensors require additional processing steps to form the different plates.

Turning now to FIG. 1, there is depicted in perspective view a mechanical model of an example angular rate sensor 100 which is implemented as a MEMS-type vibratory gyroscope (also referred to, in a non-limiting manner, as a "gyroscope," or simply "gyro") in accordance with selected embodiments of the present disclosure. The depicted MEMS gyro sensor 100 includes a pair of drive mass elements 110-111 configured to undergo in-plane oscillatory linear motion in a drive direction, a "teeter-totter" sense mass element 130 configured to undergo rotational motion about a rotational axis 140 in response to rotation around the in-plane axis 140, and a pair of coupling mass elements 120-121 configured to undergo oscillatory motion in both the sense and drive directions. In addition, link spring components 112-115, 124-127 are configured to only connect the drive and coupling masses such that the sense mass 130 is substantially decoupled from the drive mass elements 110-111 with respect to the opposed oscillatory linear motion of the drive mass elements 110-111. However, the link spring components 122-123 are configured to couple the sense mass 130 to any out-of-plane oscillatory motion of the coupling mass elements 120-121. By decoupling the drive and sense masses in this way, quadrature error and other electrical noise from the drive mass elements 110-111 to the sense mass 130 can be substantially reduced.

In the example depicted in FIG. 1, the angular rate sensor 100 is a y-gyro device that is generally configured to sense an angular rotation about rotational axis 140. By convention, y-gyro 100 is illustrated as having a generally planar structure within the x-y plane (as referenced by the x-y-z reference coordinate lines), wherein the z-axis extends upward and normal to the x-y plane. The depicted y-gyro 100 includes a reference frame or substrate structure 102 on which is formed a pair of drive masses 110-111, a pair of coupling masses 120-121, a sense mass 130, and various mechanical linkages 112-115, 122-127 provided therebetween, depending upon the particular embodiment. With the sense mass 130 constructed as a hinged or teeter-totter proof mass that is framed by opposing pairs of coupling masses 120-121 and drive masses 110-111, the mechanical linkages may include one or more suspension anchors or rotational flexures 105 formed on the substrate 102 to flexibly suspend the sense mass 130 for pivoting or rotational movement about the rotational axis 140. In addition, central x-axis springs 124, 127 may be provided as coupling springs that join the pair of opposing drive masses 110-111, and central x-axis springs 125-126 may be provided as coupling springs that join the pair of opposing coupling masses 120-121. Link springs 112-115 may also be provided as coupling springs that extend between the drive masses 110-111 and coupling masses 120-121 to enable the drive masses 110-111 to direct the motion of the coupling masses 120-121 to each exhibit substantially a single oscillation frequency in the x-axis direction while permitting z-axis movement by the coupling masses 120-121 in response to Coriolis forces. Finally, link springs 122-123 may be provided as coupling springs that join the sense mass 130 to the pair of opposing coupling masses 120-121. As will be appreciated, the springs 112-115, 122-127 may be any convenient shape that allows a opposing motion of the drive masses 110-111 and coupling masses 120-121 along the x-axis and yet is rigid enough to transfer the Coriolis force from the coupling masses 120-121 to the sense mass 130 along the z-axis. Stated another way, the linkage between drive, coupling and sensing masses is configured such that sense mass 130 is relatively unaffected by the motion of drive masses 110-111, but is linked to coupling masses 120-121 as they undergo out-of-plane motion (e.g., z-axis motion) during rotation of y-gyro 100.

With this coupling, the drive masses 110-111 are configured to undergo oscillatory linear motion within a plane (e.g., the illustrated x-y plane), where the direction of this motion may vary, depending upon the embodiment. As will be appreciated, the linear vibratory movement of the drive masses 110-111 may be controlled by applying a drive voltage to drive electrodes (not shown) at the ends of the drive masses 110-111 to produce electrostatic forces that cause the drive masses 110-111 to move in a linear, oscillating motion. By applying time varying voltage drive signal to generate alternating charge at the drive electrodes on opposing ends of the drive masses 110-111, the drive mass 110 moves in the opposite direction from drive mass 111 at all times, thereby oscillating back and forth in a vibratory manner above the reference substrate 102. Although drive masses 110-111 are separate masses that oscillate in opposing directions to maintain a net zero momentum, they are also considered together to combine as a drive mass. While the drive oscillation frequency is not precisely predetermined, it is known to be able to vary within some range based upon manufacturing tolerances (e.g., within approximately 10 percent). As a result of applying the voltage drive signal, the drive masses 110-111 have motion in the horizontal (e.g., x-axis) direction. Although the target motion of drive masses 110-111 is in the horizontal direction, due to the manufacturing imperfections in the gyroscope fabrication, the drive masses 110-111 also have undesirable motion in the vertical (z-axis) direction, which is often referred as quadrature error and/or in-phase error In the illustrated embodiment where the rotational axis 140 is in the y-axis direction, the drive masses 110-111 and coupling masses 120-121 undergo oscillatory linear motion that is substantially parallel to the x-axis. When the sense element 130 experiences a force that generates an angular movement around axis 140, this angular movement is sensed using sense measurement electrodes 103-104 formed on the substrate 120 under the sense mass 130 to sense out-of-plane teeter-totter motion of the sense mass 130. In particular, Coriolis forces cause the coupling masses 120-121 to undergo an oscillatory motion out of the plane out of the x-y plane) along the z-axis as a function of the angular rate of y-gyro 100 about rotational axis 140. The z-axis movement of the coupling masses 120-121 is in turn transferred to the sense mass 130 by the link spring components 122-123. To sense out-of-plane motion, the reference substrate 102 may include sense measurement electrodes 103, 104 which are positioned under the sense mass 130 and provided as part of the sensing system to detect and measure the out-of-plane deflection of the sense mass 130 (and indirectly, the deflection of the first and second coupling masses 120-121) in the sense motion direction (z-axis direction) as a result of gyroscopic movement about the input axis 140. In particular, when coupling masses 120-121 undergo an oscillatory out-of-plane motion that is transferred to the teeter-totter sense mass 130, the position change is sensed by sense measurement electrodes 103-104. Though not shown, there may also be additional sense measurement electrodes that are formed above the sense mass 130. In whatever configuration, the sense electrodes 103-104 are positioned and used to detect capacitance changes during operation that are caused by rotational movement of the sense mass 130 in relation to the reference substrate 102. The reference substrate may also include force feedback electrodes (not shown) which are used to apply electrostatic forces that cause the drive masses 110-111 and/or sense mass 130 to move or oscillate, or otherwise adjust the movement or oscillation of the sense mass 130.

With reference to the various mechanical linkage springs 112-115, 122-127, it will be appreciated that their shape, size, material, and spring constants may be selected in accordance with known mechanical design principles to achieve the desired sensitivity, stability, and range of y-gyro 100. Indeed, the static and dynamic properties of the gyro device 100 as a whole may be readily specified given the various constituent layers using standard mechanical methods known in the art (e.g., empirical methods, finite-element modeling, closed-form calculations, or the like). In the illustrated embodiment, y-gyro 100 is fabricated using conventional MEMS techniques and materials (e.g., silicon dioxide, single crystal polysilicon, etc.).

Figure 2:
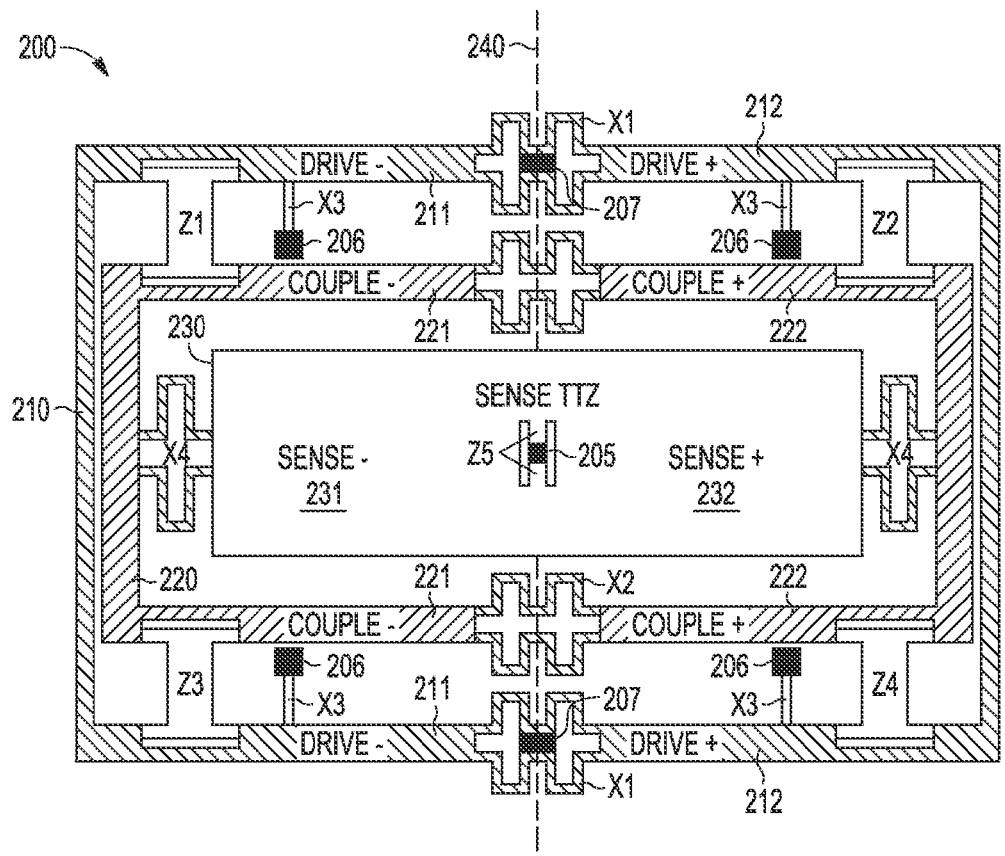
FIG. 2 shows a top-down plan view of a fully decoupled lateral axis MEMS gyroscope sensor in accordance with selected embodiments.

FIG. 2 depicts a top view of an example embodiment MEMS-type fully decoupled lateral axis MEMS gyroscope sensor 200 which includes a sense mass 230 surrounded or framed by coupling mass 220 and drive mass 210. The drive mass 210 is provided as an outer frame formed with two U-shaped drive masses 211, 212 which are connected together and to the underlying substrate anchor 207 by a first pair of x-axis springs X1 which are designed to provide linear motion along the x-axis while minimizing non-linear motion. The drive mass 211 is designated the negative drive mass and the drive mass 212 is designated the positive drive mass, though these designations may be reversed. In addition, central x-axis springs X1 couple the drive masses 211-212 together to permit oscillating movement of the drive masses 211-212 in opposite directions, while x-axis springs X3 (four springs, in this embodiment) extend connect the drive masses 211-212 to the underlying substrate anchor 206. Together, the connection of the x-axis springs X1, X3 limit out-of-plane motion of the drive masses 211-212. The drive masses 211, 212 are coupled, respectively, to opposing drive electrodes (not shown) to produce, in response to an electrical signal, the oscillatory linear motion within the x-y plane. For example, linear x-axis motion may be imparted to the drive masses 211-212 using electrical conductors or comb teeth (not shown) formed adjacent to aposite sides of the drive masses 211-212 and driven by drive signals.

The coupling mass 220 is provided as a floating inner frame formed with two U-shaped coupling masses 221, 222 which are connected together by a second pair of x-axis springs X2 which are designed to permit oscillating movement of the coupling masses 221-222 in opposite directions along the x-axis while minimizing non-linear motion. The coupling mass 221 is designated the negative couple mass and the coupling mass 222 is designated the positive couple mass, though these designations may be reversed. Oscillating linear motion from the drive masses 211, 212 is transferred, respectively, to the coupling masses 221, 222 by vertical or z-axis linkage springs Z1-Z4. As formed, the linkage springs Z1-Z4 may be any convenient shape that allows a large motion of the coupling masses 221, 222 along the z-axis in response to the Coriolis force, and yet is rigid enough to transfer movement from the drive masses 211, 212 to the coupling masses 221, 222 along the x-axis. In selected embodiments, the linkage springs Z1-Z4 are formed as springs having substantially one degree of freedom to bend only in the Z direction (e.g., the stiffness in the Z-axis direction is much smaller than the stiffness in the X-axis). When moving in the X-axis direction, the linkage springs Z1-Z4 can be considered as a rigid body that connect the drive mass and coupling mass so that there is no additional phase shift between the two.

Figure 3:
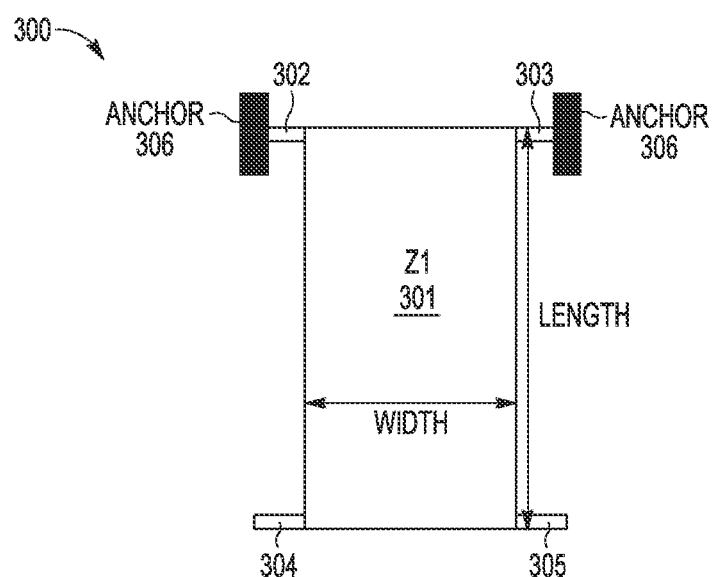
FIG. 3 shows a top-down plan view of a vertical or z-axis beam spring in the MEMS gyroscope sensor illustrated in FIG. 2.

In an example embodiment depicted in the top view of FIG. 3, the vertical or z-axis beam spring 300 (e.g., spring Z1 in the MEMS gyroscope sensor illustrated in FIG. 2) is formed with a short and wide body 301 having a length dimension that may be longer than the width dimension. The vertical beam body 301 is connected by relatively short and wide beam connector elements 302-303 to the drive mass and any anchor elements 306 affixed thereto, effectively limiting linear x-axis movement of the vertical beam spring 300 relative to the drive mass while allowing z-axis movement of the vertical beam spring 300 relative to the drive mass. The desired thickness insensitivity of the z-axis springs may be obtained by forming the beam connector elements 302-303 to be thin compared to their thickness. Thus, the stiffness in Z direction is mainly determined by the length of the 301. The vertical beam body 301 is also connected by short and wide beam connector elements 304-305 to the unanchored coupling mass, again limiting linear x-axis movement and allowing z-axis movement of the vertical beam spring 300 relative to the coupling mass. Using the short and wide vertical beam spring 300 for each of the linkage springs Z1-Z4, the resulting frequency response of the gyro is more predictable since thickness variations between different springs Z1-Z4 do not affect gyro performance.

Referring back to FIG. 2, the MEMS gyroscope sensor 200 also includes a movable proof mass element, referred to here as a sense mass 230, which is formed over a substrate and spaced apart in parallel therefrom. As depicted, the sense mass 230 is a generally planar structure having an outer peripheral wall, and is positioned to be framed within the coupling mass 220. Sense mass 230 is suspended above and pivotally coupled to substrate by an anchor system 205 which may include one or more suspension anchors or other pivot or tether elements formed on surface of underlying substrate to provide a rotational motion for the sense mass 230 around the rotational axis 240. In configuration, the sense mass 230 includes a first section 231 on one side of rotational axis 240 and a second section 232 on the other side of rotational axis 240 such that the first and second sections 231, 232 have relatively equal masses and are substantially symmetrical about axis 240. The first sense mass section 231 is designated the negative sense mass and the second sense mass section 233 is designated the positive sense mass, though these designations may be reversed. In effect, the first and second sections 231, 232 of the sense mass 230 function as electrically connected electrode plates which are capacitively coupled to underlying sense electrodes formed on the substrate.

The sense mass 230 is provided as a teeter-totter proof mass which is positioned inside the coupling mass 220 and connected thereto by a plurality of link springs X4 (two springs, in this embodiment) which are designed to permit oscillating movement of the coupling masses 221-222 in opposite directions along the x-axis. As formed, the linkage springs X4 may be any desired shape or structure, and are positioned so that oscillating linear motion from the drive and sense masses cancel one another out at the sense mass 230. In addition, the sense mass 230 is connected to the substrate anchor system 205 by one or more torsional or vertical beam spring components Z5 (two beams, in this embodiment) to constrain linear in-plane motion of the sense mass 230 relative to the underlying substrate, but to allow rotation of the sense mass 230 around the rotation axis 240. In whatever shape or structure used, the springs X4, Z5 effectively transfer non-planar motion from the coupling masses 221, 222 along the z-axis in response to the Coriolis force in the event of gyro rotation about the rotational axis 240.

Figure 4:
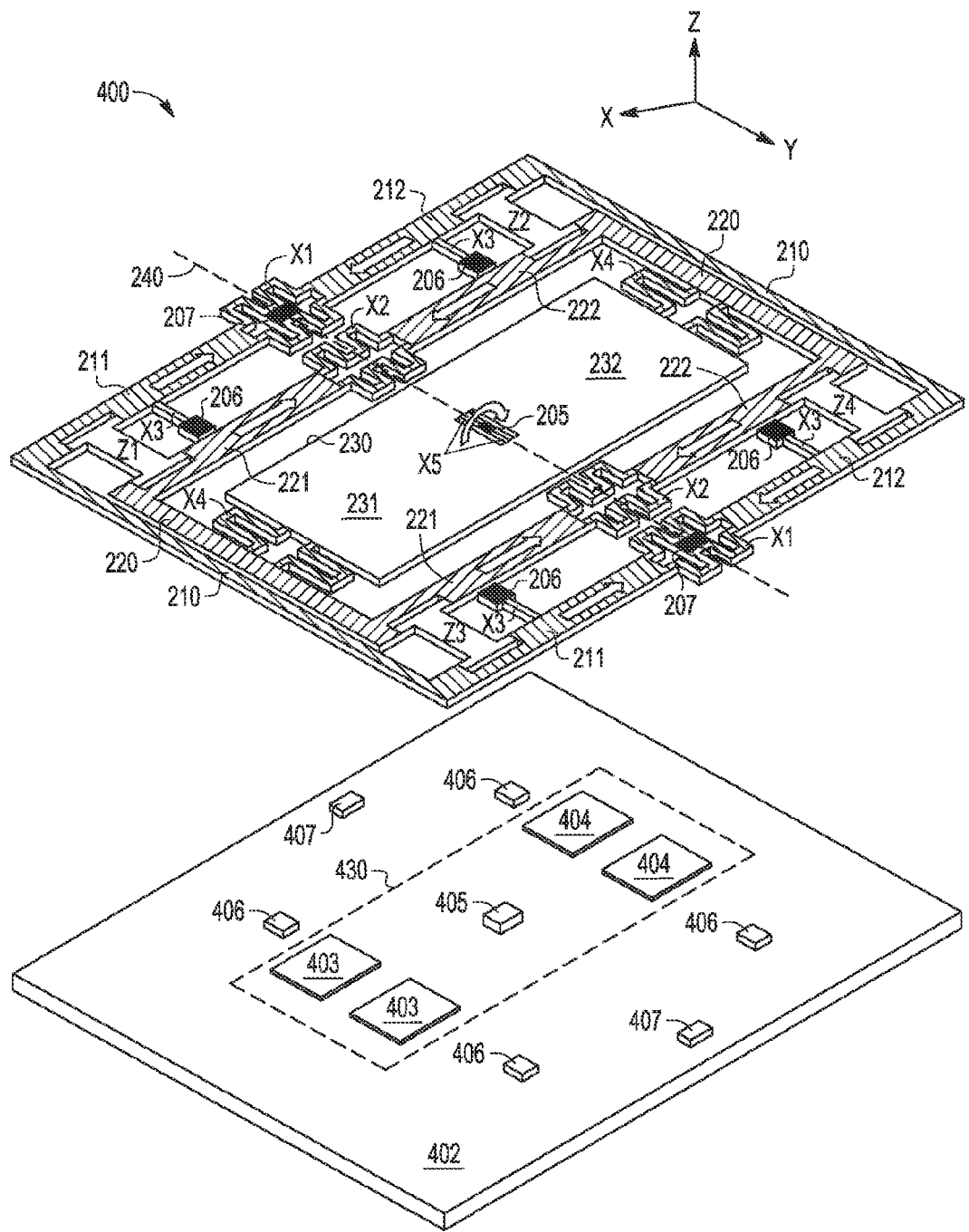
FIG. 4 shows a perspective view of the MEMS gyroscope sensor illustrated in FIG. 2.

To illustrate the operation of selected embodiments disclosed herein, reference is now made to FIG. 4 which shows an exploded perspective view 400 of the MEMS-type fully decoupled lateral axis MEMS gyroscope sensor shown in FIG. 2. As depicted, the drive mass 210, coupling mass 220 and sense mass 230 are deployed as a single three-mass system formed over a substrate 402 on which is formed a plurality of anchor elements and sense electrodes. The anchor elements are formed in alignment with corresponding anchor structures in the sensor layer. Thus, drive mass anchor elements 406 correspond in position to X3 substrate anchors 206, while center spring anchor elements 407 correspond in position to X1 substrate anchors 207. In addition, pivot mass anchor element 405 corresponds in position to X5 substrate anchor 205. Finally, a plurality of sense electrodes 403, 404 are formed on the substrate 402 and positioned beneath the sense mass 230 (as indicated by dashed line 430) to form one or more capacitive plates on each side of the rotational axis 240. The sense electrodes may be formed by depositing, patterning and etching a static conductive layer on the substrate to form at least two electrically isolated electrodes or plates 403, 404, one symmetrically disposed on each side of the rotational axis 240. The electrodes or plates 403, 404 are connected through one or more conductive via and contact layers (not shown) in the substrate 402 to capacitive signal sense circuitry which evaluates the different capacitance values associated with each electrode/plate 403, 404.

In operation, vibratory motion is imparted to the drive masses 211-212, such as by applying drive signals to opposing sides of the drive mass 210. As a result, the drive masses 211-212 are driven in opposing oscillating directions by the x-axis springs X1 with the linear movement anchored by the x-axis springs X3 and substrate anchors 206, and otherwise transferred to drive the coupling masses 221-222 in opposing oscillating directions by the vertical or z-axis linkage springs Z1-Z4. The opposing in-plane oscillating motion of the coupling masses 221-222 is cancelled by the link springs X2, X4 without imparting in-plane motion to the sense mass 230. For on long as the lateral axis MEMS gyroscope sensor 400 is stationary or otherwise not experiencing in-plane rotation around the rotation axis 240, the sense mass 230 maintains its substantially parallel position in relation to the underlying substrate 402. However, in the event that the reference substrate 402 experiences an angular velocity which generates a moment by Coriolis force onto the sense mass 230 and causes the sense mass 230 to rotate around the axis 240, this angular velocity is sensed using sense measurement electrodes 403, 404 to sense rotational out-of-plane motion of the sense mass 230. In particular, Coriolis forces cause the vibrating coupling masses 221, 222 to undergo an oscillatory motion out of the plane (i.e., out of the x-y plane) along the z-axis as a function of the angular rate of lateral axis MEMS gyroscope sensor 400 about rotational axis 240. By virtue of the link springs X4 and Z5, the non-planar motion of the coupling masses 221, 222 is transferred to the teeter-totter sense mass 230 which is positioned over the measurement electrodes 403, 404. By virtue of one or more pivot/anchor elements 405, 205 and vertical beam spring component(s) Z5 located along a center rotational axis 240, the non-planar motion of the coupling masses 221-222 is transferred to rotate the sense mass 230 about rotational axis 240 to form capacitors between the first and second sense mass sections 231, 232 and the respective electrode elements 403 and 404. While only two electrode elements 403, 404 are shown in FIG. 4 for simplicity of illustration, it will be appreciated that the lateral axis MEMS gyroscope sensor 400 may include a different quantity and/or different configuration of electrode elements. In addition, it should be understood that a number of flexures, hinges, and other rotational mechanisms may be utilized to enable pivotal movement of sense mass 230 about rotational axis 240 in response to the Coriolis effect at the coupling mass 220.

As seen from the foregoing embodiments, a lateral axis MEMS gyroscope sensor is provided in which a single three-mass sensor includes mechanically decoupled drive and sense masses which employ fully symmetric designs to suppress undesired modes, including a symmetric teeter-totter sense mass structure for sensing rotation around the rotational axis that is detected as a capacitive difference signal by capacitive electrodes below the symmetric sense mass structure. In addition, a vertical beam design used for the z-axis springs having a torsional portion that is thinner than its thickness provides more predictable frequency response performance that is not sensitive to thickness variation. According to selected embodiments, the fully decoupled and symmetric lateral axis MEMS gyroscope sensor detection device is fabricated by forming the drive, coupling and sense masses using only a single processing mask set.

By now, it should be appreciated that there has been provided herein a lateral axis MEMS sensor for measuring rotational motion about a center line axis and associated method of operation. The disclosed lateral axis sensor includes a substrate having a pair of electrodes symmetrically positioned in relation to a center line axis. In addition, a symmetric single three-piece gyro sensor is provided which is positioned in spaced apart relationship above a surface of said substrate. As formed, the gyro sensor includes a mechanically decoupled drive mass, coupling mass, and sense mass that is adapted for rotational motion relative to the center line axis in response to a Coriolis force applied to the coupling mass, where the rotational motion is detected by the pair of electrodes on the substrate that are disposed beneath the sense mass. In selected embodiments, the gyro sensor includes a pair of drive masses formed in a single layer and symmetrically disposed in relation to the center line axis, where the drive masses are coupled by a first anchor system to the substrate to enable the drive masses to undergo oscillator linear motion within a plane. The gyro sensor may also include a pair of coupling masses formed in the single layer and symmetrically disposed in relation to the center line axis, where the coupling masses are coupled by a first spring system to the drive masses to drive the coupling masses to undergo oscillatory linear motion within the plane and to drive the coupling masses to undergo oscillatory out of the plane motion as a function of the angular rate about the center line axis. In selected embodiments, the first spring system is formed as a plurality of vertical beam torsional springs for connecting the pair of drive masses to the pair of coupling masses. In these embodiments, each vertical beam torsional spring includes of a plurality of short and narrow torsion beams and a wide vertical beam body such that the lateral axis MEMS sensor will have resonance frequency which is insensitive to the variation of the structural layer thickness. Each beam body has a length dimension parallel to the center line axis that may be (but is not required to be) longer than a width dimension in the plane that is orthogonal to the center line axis, and is connected between a drive mass and sense mass with a plurality of beam connector elements to effectively limit in-plane movement of the body relative to the drive mass and sense mass while allowing non-planar movement of the body relative to the drive and sense mass. In selected embodiments, the gyro sensor includes a sense mass formed in the single layer and symmetrically disposed in relation to the center line axis, where the sense mass is coupled by a second anchor system to the substrate and is coupled by a second spring system to the pair of coupling masses to undergo rotational motion about the center line axis when the pair of coupling masses undergo oscillatory out of the plane motion. In these embodiments, the second anchor system may be formed with a first pivot element attached to the substrate below the center line axis and attached to the sense mass at the center line axis with a third spring system. In addition, the second spring system may be formed with a pair of linkage springs formed in the single layer and disposed on opposite ends of the sense mass for connection, respectively, to the pair of coupling masses. As formed, the drive mass is designed to move only in in-plane direction, the coupling mass is designed to move in both in-plane and out-of-plane directions, and the sense mass is a symmetrical teeter tottering mass which is designed to move only in out-of-plane direction to rotate around a pivotal axis to suppress undesirable resonance mode and linear acceleration and/or acoustic interference.

In another form, there is provided a transducer adapted to sense angular rotation about a rotational axis, where the sensor includes a proof mass, a pair of coupling masses, and a pair of drive masses formed in a single layer over a substrate. The proof mass is positioned above a surface of said substrate and adapted for motion relative to the rotational axis. On the substrate, pair of electrodes is disposed beneath the proof mass for detecting rotation motion of the proof mass relative to the rotational axis, and an anchor system may be formed for pivotally coupling the proof mass to the substrate at said rotational axis to enable said first proof mass to rotate about said rotational axis in response to said angular rotation about the rotational axis. In addition, the pair of coupling masses is positioned above the surface of said substrate and connected to each other by a first spring system to enable the pair of coupling masses to undergo opposed oscillatory motion within a plane that is parallel to the surface of the substrate, where the pair of coupling masses are disposed symmetrically in relation to the rotational axis and connected on opposite sides of the proof mass by a second spring system which enables the proof mass to rotate about the rotational axis when the pair of coupling masses undergoes oscillatory out of the plane motion. Finally, the pair of drive masses is positioned above the surface of said substrate and connected to each other by a third spring system to enable the pair of drive masses to undergo oscillatory motion within a plane that is parallel to the surface of the substrate, where the pair of drive masses are disposed symmetrically in relation to the rotational axis and connected to the pair of coupling masses by a fourth spring system to drive the pair of coupling masses into opposed oscillatory motion within a plane that is parallel to the surface of the substrate and to enable the pair of coupling masses to undergo oscillatory out of the plane motion in response to a Coriolis force applied to the pair of coupling masses. In selected embodiments, the fourth spring system is forms with a plurality of vertical beam torsional springs, where each vertical beam torsional spring comprises a plurality of short and narrow torsion beams and a wide vertical beam such that the lateral axis MEMS sensor will have resonance frequency which is in-sensitive to the variation of the structural layer thickness. In other embodiments, the fourth spring system may be formed with a plurality of vertical beam torsional springs for connecting the pair of drive masses to the pair of coupling masses, where each vertical beam torsional spring includes a body having a length dimension parallel to the center line axis that is longer than a width dimension in the plane that is orthogonal to the center line axis, and a plurality of beam connector elements which connect the body between a drive mass and sense mass to effectively limit in-plane movement of the body relative to the drive mass and sense mass while allowing non-planar movement of the body relative to the drive and sense mass. The drive masses are coupled by an anchor system to the substrate to enable the pair of drive masses to undergo opposed oscillatory motion within a plane, where the anchor system may include one or more first anchors for connecting the third spring system to the substrate, and one or more second anchors for flexibly connecting each drive mass to the substrate to enable the pair of drive masses to undergo oscillatory motion within a plane that is parallel to the surface of the substrate.

Although the described exemplary embodiments disclosed herein are directed to various lateral axis MEMS gyroscope sensor structures and methods for making same, the present invention is not necessarily limited to the example embodiments which illustrate inventive aspects of the present invention that are applicable to a wide variety of MEMS sensor devices, manufacturing methods and operational methodologies. While the disclosed MEMS devices may be implemented as a gyroscope, the fabrication process described herein is not limited to gyroscopes or any other type of sensor, but is also applicable to any one of numerous MEMS devices that include some type of structure that is movably suspended by one or more springs and that is formed by bonding an active wafer to a reference wafer. Non-limiting examples of such devices include various types of accelerometers and switches, optical MEMS system components, and other MEMS system devices that use drive and sense electrodes. Thus, the particular embodiments disclosed above are illustrative only and should not be taken as limitations upon the present invention, as the invention may be modified and practiced in different but equivalent manners apparent to those skilled in the art having the benefit of the teachings herein. For example, the methodology of the present invention may be applied using drive mass and sense mass structures other than expressly set forth herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. The term "coupled," as used herein, is not intended to be limited to a direct coupling or a mechanical coupling. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A lateral axis MEMS sensor for measuring rotational motion about a center line axis, comprising:
    a substrate;
    a pair of electrodes formed on the substrate and symmetrically positioned in relation to a center line axis; and
    a symmetric gyro sensor positioned in spaced apart relationship above a surface of said substrate and comprising a drive mass, a coupling mass connected to the drive mass, and a sense mass connected to the coupling mass, such that the sense mass is mechanically decoupled from the drive mass, where the sense mass is adapted for rotational motion relative to the center line axis in response to a Coriolis force applied to the coupling mass, where the rotational motion is detected using the pair of electrodes on the substrate that are disposed beneath the sense mass.

2. The lateral axis MEMS sensor of claim 1, where the drive mass comprises a pair of drive masses formed in a first layer and symmetrically disposed in relation to the center line axis, where the pair of drive masses are coupled by a first anchor system to the substrate to enable the pair of drive masses to undergo oscillatory linear motion within a plane.

3. The lateral axis MEMS sensor of claim 2, where the coupling mass comprises a pair of coupling masses formed in the first layer and symmetrically disposed in relation to the center line axis, where the pair of coupling masses are coupled by a first spring system to the pair of drive masses to drive the pair of coupling masses to undergo oscillatory linear motion within the plane and to drive the pair of coupling masses to undergo oscillatory out of the plane motion as a function of the angular rate about the center line axis.

4. The lateral axis MEMS sensor of claim 3, where the first spring system comprises a plurality of vertical beam torsional springs for connecting the pair of drive masses to the pair of coupling masses, where each vertical beam torsional spring comprises:
 a body having a length dimension parallel to the center line axis that is longer than a width dimension in the plane that is orthogonal to the center line axis; and
 a plurality of beam connector elements which connect the body between a drive mass and sense mass to effectively limit in-plane movement of the body relative to the drive mass and sense mass while allowing non-planar movement of the body relative to the drive and sense mass.

5. The lateral axis MEMS sensor of claim 4, where the vertical beam torsional spring comprises of a plurality of short and narrow torsion beams and a wide vertical beam such that the lateral axis MEMS sensor will have resonance frequency which is in-sensitive to the variation of the structural layer thickness.

6. The lateral axis MEMS sensor of claim 3, where the sense mass is formed in the first layer and symmetrically disposed in relation to the center line axis, where the sense mass is coupled by a second anchor system to the substrate and is coupled by a second spring system to the pair of coupling masses to undergo rotational motion about the center line axis when the pair of coupling masses undergo oscillatory out of the plane motion.

7. The lateral axis MEMS sensor of claim 6, where the second anchor system comprises a first pivot element attached to the substrate below the center line axis and attached to the sense mass at the center line axis with a third spring system.

8. The lateral axis MEMS sensor of claim 6, where the second spring system comprises a pair of linkage springs formed in the first layer and disposed on opposite ends of the sense mass for connection, respectively, to the pair of coupling masses.

9. The lateral axis MEMS sensor of claim 1, where the drive mass is designed to move in an in-plane direction, the coupling mass is designed to move in both an in-plane and out-of-plane directions, and the sense mass is designed to move in an out-of-plane direction.

10. The lateral axis MEMS sensor of claim 9, where the sense mass is a symmetrical teeter tottering mass which rotates around a pivotal axis to suppress undesirable resonance mode and linear acceleration and/or acoustic interference.

11. A transducer adapted to sense angular rotation about a rotational axis comprising:
 a substrate;
 a proof mass positioned above a surface of said substrate and adapted for motion relative to the rotational axis;
 a pair of coupling masses positioned above the surface of said substrate and connected to each other by a first spring system to enable the pair of coupling masses to undergo opposed oscillatory motion within a plane that is parallel to the surface of the substrate, where the pair of coupling masses are disposed symmetrically in relation to the rotational axis and connected on opposite sides of the proof mass by a second spring system which enables the proof mass to rotate about the rotational axis when the pair of coupling masses undergoes oscillatory out of the plane motion; and
 a pair of drive masses positioned above the surface of said substrate and connected to each other by a third spring system to enable the pair of drive masses to undergo oscillatory motion within a plane that is parallel to the surface of the substrate, where the pair of drive masses are disposed symmetrically in relation to the rotational axis and connected to the pair of coupling masses by a fourth spring system to drive the pair of coupling masses into opposed oscillatory motion within a plane that is parallel to the surface of the substrate and to enable the pair of coupling masses to undergo oscillatory out of the plane motion in response to a Coriolis force applied to the pair of coupling masses.

12. The transducer of claim 11, where the pair of drive masses are coupled by a first anchor system to the substrate to enable the pair of drive masses to undergo opposed oscillatory motion within a plane.

13. The transducer of claim 12, where the first anchor system comprises:
 one or more first anchors for connecting the third spring system to the substrate, and
 one or more second anchors for flexibly connecting each drive mass to the substrate to enable the pair of drive masses to undergo oscillatory motion within a plane that is parallel to the surface of the substrate.

14. The transducer of claim 11, further comprising an anchor system formed on said surface of said substrate, said anchor system pivotally coupling said proof mass to the substrate at said rotational axis to enable said proof mass to rotate about said rotational axis in response to said angular velocity about the rotational axis.

15. The transducer of claim 11, further comprising a pair of electrodes formed on the surface of said substrate and disposed beneath the proof mass for detecting rotation motion of the proof mass relative to the rotational axis.

16. The transducer of claim 11, where the fourth spring system comprises a plurality of vertical beam torsional springs for connecting the pair of drive masses to the pair of coupling masses, where each vertical beam torsional spring comprises:
 a body having a length dimension parallel to the center line axis that is longer than a width dimension in the plane that is orthogonal to the center line axis; and
 a plurality of beam connector elements which connect the body between a drive mass and sense mass to effectively limit in-plane movement of the body relative to the drive mass and sense mass while allowing non-planar movement of the body relative to the drive and sense mass.

17. The transducer of claim 11, where the proof mass, the pair of coupling masses, and the pair of drive masses are all formed in a single layer.

18. The transducer of claim 11, where the pair of drive masses is designed to move only in in-plane direction, the pair of coupling masses is designed to move in both in-plane and out-of-plane directions, and the proof mass is designed to move only in out-of-plane direction.

19. The transducer of claim 11, where the proof mass is a symmetrical teeter tottering mass which rotates around a pivotal axis to suppress undesirable resonance mode.

20. The transducer of claim 11, where the proof mass is a symmetrical teeter tottering mass which rotates around a pivotal axis to increase resistance to linear acceleration and/or acoustic interference.

21. The transducer of claim 11, where the fourth spring system comprises a plurality of vertical beam torsional springs, where each vertical beam torsional spring comprises a plurality of short and narrow torsion beams and a wide vertical beam such that the lateral axis MEMS sensor will have resonance frequency which is in-sensitive to the variation of the structural layer thickness.

* * * * *

UNITED STATES PATENT AND TRADEMARK OFFICE
CERTIFICATE OF CORRECTION

| | | |
|---|---|---|
| PATENT NO. | : 8,689,632 B2 | Page 1 of 1 |
| APPLICATION NO. | : 13/351937 | |
| DATED | : April 8, 2014 | |
| INVENTOR(S) | : Kemiao Jia and Yizhen Lin | |

It is certified that error appears in the above-identified patent and that said Letters Patent is hereby corrected as shown below:

In the Claims

Claim 5, col. 11, line 26 should read "vertical beam torsional spring comprises a plurality of"

Signed and Sealed this
Twenty-fourth Day of June, 2014

Michelle K. Lee
*Deputy Director of the United States Patent and Trademark Office*